US008431839B2

(12) United States Patent
Hörnstein

(10) Patent No.: US 8,431,839 B2
(45) Date of Patent: *Apr. 30, 2013

(54) BEARING ELEMENT WITH WEIGHT MEASUREMENT FOR LIFTING PLATFORMS

(75) Inventor: Roland Hörnstein, Pfalzgrafenweiler (DE)

(73) Assignee: Roland Hörnstein GmbH & Co., KG, Pfalzgrafenweiler (DE)

( * ) Notice: Subject to any disclaimer, the term of this patent is extended or adjusted under 35 U.S.C. 154(b) by 318 days.

This patent is subject to a terminal disclaimer.

(21) Appl. No.: 12/741,911

(22) PCT Filed: Nov. 19, 2008

(86) PCT No.: PCT/DE2008/001906

§ 371 (c)(1),
(2), (4) Date: May 7, 2010

(87) PCT Pub. No.: WO2009/065388

PCT Pub. Date: May 28, 2009

(65) Prior Publication Data

US 2010/0263942 A1 Oct. 21, 2010

(30) Foreign Application Priority Data

Nov. 19, 2007 (DE) ......................... 10 2007 055 330

(51) Int. Cl.
*B66F 7/28* (2006.01)
*B66F 17/00* (2006.01)
*G01G 19/02* (2006.01)
*G01G 5/04* (2006.01)

(52) U.S. Cl.
USPC ............ 177/141; 177/146; 177/208; 177/254

(58) Field of Classification Search .................. 177/141, 177/208, 209, 254, 146
See application file for complete search history.

(56) References Cited

U.S. PATENT DOCUMENTS 2,022,203 A * 11/1935 Hughes .................... 73/862.581

(Continued)

FOREIGN PATENT DOCUMENTS

| | | | |
|---|---|---|---|
| DE | 29 37 582 | A1 | 4/1981 |
| DE | 93 12 286 | U1 | 10/1993 |
| DE | 10 2005 000 883 | A1 | 7/2006 |
| EP | 0 631 976 | A1 | 1/1995 |

OTHER PUBLICATIONS

International Search Report for corresponding International Application No. PCT/DE2008/001906 mailed Jun. 9, 2009.

(Continued)

*Primary Examiner* — Randy W Gibson

(74) *Attorney, Agent, or Firm* — Renner, Otto, Boisselle & Sklar, LLP

(57) ABSTRACT

The invention relates to a bearing element for lifting platforms, which is a displaceable part of a bearing arm of a load receiving element of a lifting platform, with a vehicle bearing element resting on that end of said bearing element that protrudes from the carrier, wherein at least one annular recess, in particular an annular groove, is arranged on the upper side of said bearing element, in which at least one vertically displaceable transfer element is disposed that seals a pressure chamber that is filled with hydraulic fluid and is disposed below said transfer element, with the transfer element generating in the pressure chamber a pressure that is characteristic for the weight.

10 Claims, 2 Drawing Sheets

U.S. PATENT DOCUMENTS

| | | | | | |
|---|---|---|---|---|---|
| 2,646,272 | A | * | 7/1953 | Swift | 177/141 |
| 3,200,897 | A | | 8/1965 | Gibbons | |
| 4,055,227 | A | * | 10/1977 | Brackett | 177/208 |
| 4,450,906 | A | * | 5/1984 | Firmin | 166/113 |
| 2010/0276212 | A1 | * | 11/2010 | Hornstein | 177/146 |

OTHER PUBLICATIONS

Form PCT/ISA/237 for International Application No. PCT/DE2008/001906 dated Jun. 9, 2009.

* cited by examiner 1
2
3
4
5
6
7
8
9
10
11
12
13
14
15
16
17
18
26
28
29
30
31
32
34

BEARING ELEMENT WITH WEIGHT MEASUREMENT FOR LIFTING PLATFORMS

TECHNICAL FIELD OF INVENTION

This invention relates to a bearing element with weight measurement for lifting platforms. Lifting platforms are used, among others, in automobile repair shops in order to raise vehicles for the purpose of repair and maintenance. The invention is described with reference to an automobile lifting platform.

Automobile lifting platforms are equipped with a wide variety of load receiving elements for raising the vehicles. Most frequently, so-called pivoting-arm load receiving elements are used that have four carrying arms with which the vehicles are lifted at four points or places. Usually, the carrying arms can be adjusted by telescoping in one or several stages. At the extended end of the last stage, a so-called vehicle support element is located. The upper side of the vehicle support element usually carries a rubber pad that serves as the contact surface for supporting the vehicle.

When supporting vehicles, it is important, on the one hand, to support the vehicles safely, i.e. at the correct locations on the underside of the vehicle. On the other hand, in terms of its adjustability and adaptability to the vehicle to be raised, in particular in terms of the shape and design of its contact surface, the vehicle support element must be suitable for the vehicle to be raised. In addition, the maximum load capacity of the lifting platform or of a single carrying arm must not be exceeded.

In the field, vehicle support elements that were inserted into the carrying arms of the load receiving element proved to be practical. The connection by way of insertion is designed so that a hole is located at the end of the bearing element that is extendable the furthest. For the purpose of positioning, at its lower end the vehicle support element has some type of pin that can be inserted into the hole in the bearing element, and a contact surface that rests flat on the bearing element and carries the weight of the vehicle. This results in a stable plug connection into which the appropriate vehicle support element for the type of vehicle in question can be inserted so that the vehicle can be supported safely in the manner specified by the vehicle manufacturer at the locations intended for this purpose. In this manner, it is possible in particular to use special vehicle support elements that may possibly be needed for only one type of vehicle on several lifting platforms.

In addition, vehicle support elements exist that can be pushed onto the carrying arm, having a profile that at least partially surrounds the carrying arm.

In everyday repair shop operations, vehicles are not always supported in accordance with the center of gravity of the vehicle, but frequently with the load distributed towards one side. One-sided load distribution means that not every carrying arm bears the same load. Usually, the one-sided load distribution occurs in the longitudinal direction of the vehicle. On the one hand, the load of the vehicle is distributed differently in the longitudinally direction—i.e. in the front and in the rear—and, on the other hand, vehicles, in particular station wagons or utility vans, may be loaded on one side only. In addition, the adjustability of the carrying arms permits a one-sided support of the vehicle in that, for example, the carrying arms of the front side are fully extended while the carrying arms of the rear side are fully retracted. In part, this one-sided lifting with uneven load distribution is unintentional because the operator is unaware of it. In part, it is intentional because the one-sided raising of the vehicle provides better access to the vehicle for certain repair and/or maintenance work, for example the removal and installation of axles, the transmission, or the engine. Therefore, on the one hand, the one-sided raising of the vehicles makes the work easier. On the other hand, it is a source of danger that may lead to the impermissible loading of an individual carrying arm and/or the lifting platform or even to the vehicle falling off the lifting platform.

DISCUSSION OF RELATED ART

The patent disclosure DE 29 37 582 A1 describes a lifting platform, specifically a dual-column lifting platform for automobiles where force measuring devices are arranged on the bearing elements whose output signals are fed into a downstream safety circuit that compares the signals with voltage values on the bearing elements that are proportional to permissible loads and actuates an alarm and/or braking device if the permissible voltage values are exceeded. The system known from DE 29 37 582 A1 is a component of the lifting platform. For example, it cannot be applied to lifting platforms that are already in operation. Also, this system is very complex and therefore also very expensive.

The utility model DE 93 12 286.1 describes a lifting platform with a plurality of carrying arms wherein, at the free ends of said carrying arms, removable support plates or similar devices are arranged on which sensors, switches, or similar devices detecting weight loads or one-sided loads are arranged that are connected to a display device, monitoring device, or a similar device. It is a disadvantage that a power supply is required, in the form of batteries or solar cells, or via radar and reflecting surfaces.

The patent disclosure U.S. Pat. No. 3,200,897 describes a hydraulic weight scale carried by trucks that is intended for mobile operation at different locations. Via a tilting platform, the truck can be driven onto the weight scale and the wheel load or, when several weight scales are used simultaneously, the axle load or the total weight can be measured during the loading process or during weight checks performed by the authorities. The weight scale consists of a cylinder housing with a strong bottom surface with which it rests on the ground. On the upper side, the cylinder housing has an opening. From this opening, a solid plunger piston protrudes vertically. Below the plunger piston there is a hydraulic fluid that indicates a pressure commensurate with the wheel load resting on it. This weight scale has the disadvantage that the plunger piston is made of solid material. Specifically, it is not possible to arrange a passage or a threaded bore inside the plunger piston in which a vehicle support element could be housed whose height is adjustable, for example by means of a threaded spindle.

SUMMARY OF THE INVENTION

This invention addresses the problem of improving the handling and the safety of lifting platforms, even those that are already in operation. Regardless of which vehicle support element is being used, at each bearing element and in a simple way, the invention provides an indication to the operator of whether the vehicle rests sufficiently loaded on the vehicle support elements and the bearing elements of the load receiving element. In addition, it indicates whether a single carrying arm of the load receiving element is overloaded or whether the maximum weight capacity of the lifting platform has been exceeded.

Furthermore, the weight measurement will be possible without the supply of external energy, in particular without a power supply, so that a very inexpensive manufacture and retrofitting of lifting platforms becomes possible.

According to the invention, this is achieved by means of a bearing element with weight measurement for lifting platforms according to claim 1. Advantageous embodiments and advanced implementations are the subject of the dependent claims.

The bearing element for lifting platforms according to the invention is a displaceable component of the load receiving element that is connected displaceably and non-permanently to the lifting platform in a secure connection. It is usually the last member of a preferably telescoping carrying arm on which a vehicle support element rests and/or onto which it is pushed and/or into which it is inserted.

At least one recess is arranged in the bearing element in the area of the bearing element on which the vehicle support element rests. Preferably, this recess has the shape of an annular groove. The annular groove is of sufficient depth to offer space inside for an equally annular transfer element and a pressure chamber immediately below the transfer element. The pressure chamber is filled with a hydraulic fluid and is connected to a pressure gauge that can be read from outside. Preferably, the transfer element seals the pressure chamber hydraulically and protrudes partially from the bearing element. This ensures that the weight resting on the vehicle support element is transferred to the bearing element only by the transfer element, generating inside the pressure chamber a hydraulic pressure that is characteristic for the vehicle weight.

Advantageously, the annular surface of the transfer element is designed to be as large as possible. In this context, 'as large as possible' means that the support surface of the vehicle support element preferably covers, or at least essentially covers, the annular surface of the transfer element. This offers the advantage that, regardless of whether an identical load rests centrally or eccentrically on the rubber pad, approximately the same measured data will be displayed.

In another embodiment, several individual cavities may be arranged in the bearing element of the load receiving element in such a way, and may be interconnected by channels, for example, that even eccentric loads can be measured with accuracy.

In a suitable location—preferably at that side of the bearing element where it is clearly visible from the outside when the vehicle has been raised—a pressure gauge, e.g., a manometer, is installed. This manometer can be scaled to indicate either a pressure or a weight force in relation to the effective pressure surface.

Depending on the requirements, different pressure gauges may be connected to the support element. So-called mechanical pressure gauges like tube spring manometers, capsule spring manometers, plate spring manometers or other types of manometers may be connected to the bearing element. This has the advantage that no electric power supply is needed and that the pressure gauge is always operational.

In another embodiment, so-called digital manometers may be connected, for example to a digital display showing the numeric value by unit and/or text. Also, digital manometers are available that store measured data and are able to generate acoustic warning signals. These, however, require an electric power supply.

This invention offers the advantage that every time a vehicle is raised, the weight is measured automatically in a simple way on all carrying arms of a lifting platform—this usually means the four arms of the load receiving element of a lifting platform on which the vehicle rests. Likewise, different types and/or shapes of vehicle support elements may also be present. If one carrying arm of the load receiving element is overloaded, or if there is no vehicle weight or too little vehicle weight on another carrying arm of the load receiving element, a correction may be made and the vehicle can be supported in a secure position so that the aforementioned risks are minimized and sources of danger are neutralized. It can also be detected if a vehicle is loaded whose weight exceeds the maximum carrying capacity of the lifting platform.

It is an additional advantage that the bearing element according to the invention can be retrofitted to older models of lifting platforms simply by removing the "old bearing element" and inserting the "new bearing element with weight measurement".

Below, the invention is described in detail and explained with reference to the embodiments shown in the drawing.

DETAILED DESCRIPTION OF THE INVENTION

Figures 1, 2, 3:
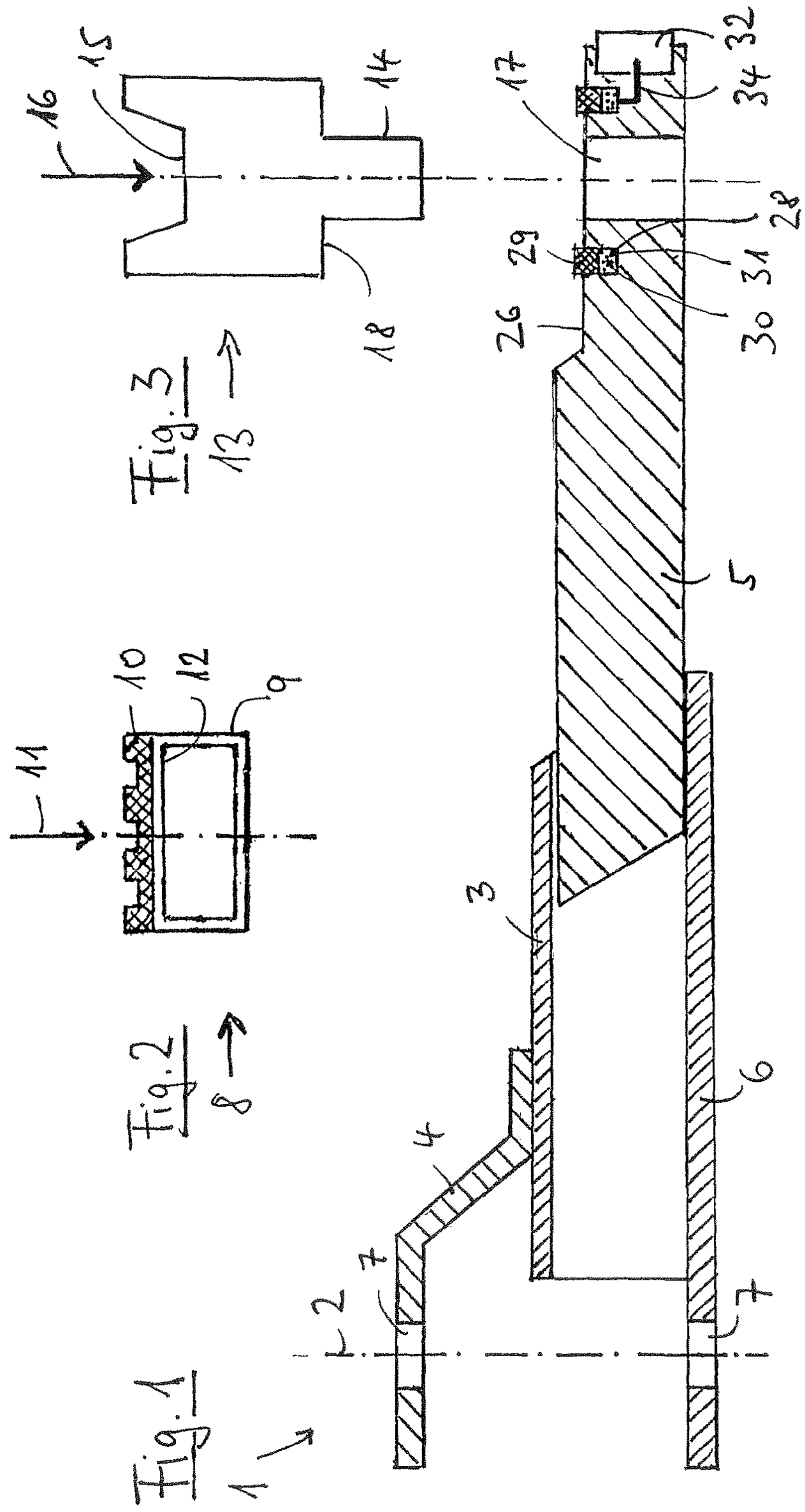
FIG. 1 shows a simplified, schematic, not-to-scale section view through a carrying arm of a pivoting-arm load receiving element of an automobile lifting platform with a vehicle support element.
FIG. 2 shows a simplified, schematic, not-to-scale vehicle support element with a rubber pad for lifting at the vehicle underside that can be pushed onto the bearing element according to the invention and is exchangeable.
FIG. 3 shows a simplified, schematic, not-to-scale vehicle support element for lifting at an axle or at the frame of the vehicle that can be inserted into the bearing element according to the invention and is exchangeable.

In a longitudinal section, FIG. 1 shows a carrying arm 1 of a pivoting-arm load receiving element (not shown) of an automobile lifting platform (not shown). The carrying arm 1 is mounted horizontally pivotable around a vertical axis 2. The carrying arm 1 consists of a carrier 3 that is welded to a bent strut 4 and of a longitudinally displaceable telescoping bearing element 5. The lower chord 6 of the carrier 3 and the strut 4 each contain a bearing hole 7 that is concentric to the vertical axis 2.

FIG. 2 shows a vehicle support element 8 consisting of a hollow profile 9 that can be pushed with minimum play onto the outer end of the cross-sectional profile of the bearing element 5. The cross-section of the hollow profile 9 matches the cross-section of the bearing element 5.

In the embodiment shown, the hollow profile is rectangular. A rubber pad 10 is attached on top of the hollow profile 9. The rubber pad 10 represents the contact surface for the vehicle (not shown). The weight force 11 generated by the raised vehicle acts on the rubber pad 10. In its upper area, the hollow profile 9 has a support surface 12 on the inside.

FIG. 3 shows a vehicle support element 13 that has a round pin 14 at the bottom. On its upper side, the vehicle support element 13 has a trough-like recess 15. This trough-like recess 15 represents the contact surface for the vehicle (not shown) and ensures that vehicles can be supported positively and securely at vehicle axles and/or at the vehicle frame. The weight force 16 generated by the raised vehicle acts on the trough-like recess 15. The pin 14 fits with minimum play in a hole 17 located in the bearing element 5. A contact surface 18 is provided around the pin 14.

Figure 4:
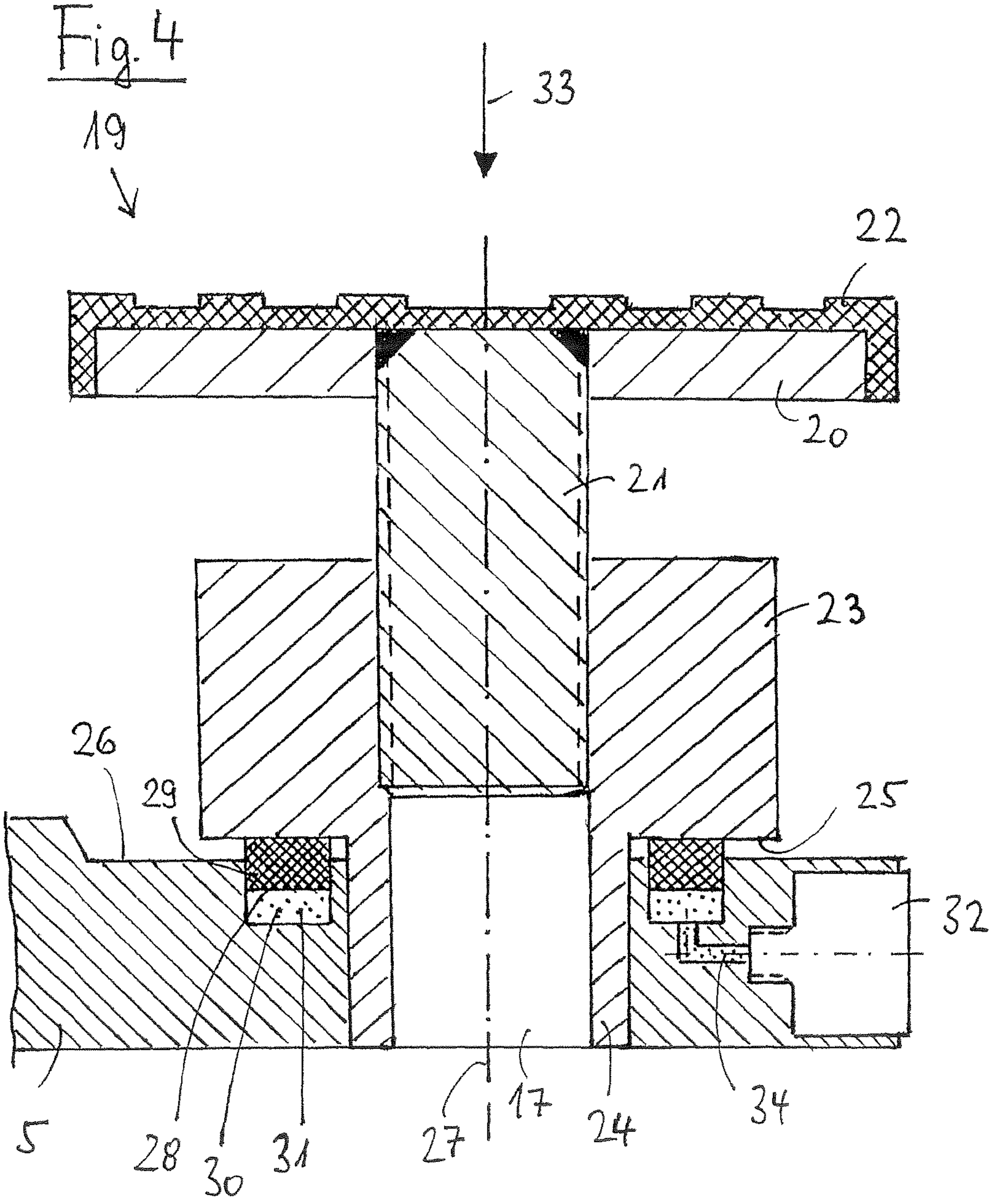
FIG. 4 shows a simplified, schematic, not-to-scale and axially sectioned detail view of a bearing element according to the invention of a pivoting-arm load-receiving element for automobile lifting platforms with a pressure gauge, into which a rubber-padded vehicle support element is inserted that is suitable for lifting the vehicle at its underside.

FIG. 4 shows in detail the outer end of the bearing element 5 and an inserted vehicle support element 19. The vehicle support element 19 consists of a round steel plate 20 that is welded to a threaded spindle 21 and of a rubber pad 22. The rubber pad 22 represents the contact point for supporting the vehicles (not shown) that are lifted at their underside. The threaded spindle 21 is supported rotation-adjustably and height-adjustably in the base body 23. At its lower end, the base body 23 changes to a sleeve 24 that is inserted with minimum play into the hole 17 of the bearing element 5. On the base body 23, a contact surface 25 is provided concentrically around the sleeve 24.

At its end protruding from the carrier 3, the bearing element 5 has on its upper side 26 a stepped-down surface with a hole 17 that is coaxial with the axis 27. Around the hole 17, an annular recess 28 in the form of an annular groove is arranged concentrically. A transfer element 29 that seals the pressure chamber 30 is fitted into the annular groove. The annular groove is part of the pressure chamber 30. The pressure chamber 30 is filled with a hydraulic fluid 31. With the smaller portion of its height, the transfer element 29 protrudes from the annular groove over the entire annular surface. This ensures that the vehicle support elements 8, 13, 19 rest exclusively on the transfer element 29 with their contact surfaces 12, 18, 25.

The pressure chamber 30 is connected to a pressure gauge 32 via a channel 34. If a weight force 33 is generated at any place on the rubber pad 22 by the raising of a vehicle, said weight force generates—via the steel plate 20, the welded-on threaded spindle 21, the base body 23, and the transfer element 29—a pressure in the pressure chamber 30 that is characteristic of the weight force 33, and this pressure is transmitted by the hydraulic fluid 31 and through the channel 34 to the pressure gauge 32 where it is displayed. The pressure gauge 32 is mounted clearly visibly on the bearing element 5, for example at its lateral end.

In the two other vehicle support elements 8, 13, the same action follows when a weight force is generated by the raising of a vehicle. Here, too, the annular transfer element 29 is exposed to the weight force 11, 16 and causes a hydraulic pressure that is indicated by the pressure gauge.

LIST OF REFERENCE NUMBERS

1 carrying arm
2 vertical axis
3 carrier
4 strut
5 bearing element
6 lower chord
7 bearing hole
8 vehicle support element
9 hollow profile
10 rubber pad
11 weight force
12 contact surface
13 vehicle support element
14 pin
15 through-like recess
16 weight force
17 hole
18 contact surface
19 vehicle support element
20 steel plate
21 threaded spindle
22 rubber pad
23 base body
24 sleeve
25 contact surface
26 upper side
27 axis
28 recess
29 transfer element
30 pressure chamber
31 hydraulic fluid
32 pressure gauge
33 weight force
34 channel

The invention claimed is:

1. A bearing element for lifting platforms, which is a displaceable part of a bearing arm of a load receiving element of a lifting platform, with a vehicle support element resting on that end of said bearing element that protrudes from a carrier, wherein at least one annular recess is arranged on the upper side of said bearing element, in which at least one vertically displaceable annular transfer element is disposed that seals an annular pressure chamber formed by said annular recess that is filled with hydraulic fluid and is disposed below said transfer element, with the transfer element generating in the pressure chamber a pressure that is characteristic of the weight force.

2. A bearing element according to claim 1, wherein the annular recess has the shape of a groove and that the pressure chamber has at least one channel for pressure measurements.

3. A bearing element according to claim 1, wherein the pressure generated in the pressure chamber is directly transmitted to a pressure gauge and displayed there.

4. A bearing element according to claim 1, wherein the transfer element sits only partially in the recess that is part of the pressure chamber, with the transfer element protruding from the recess with the smaller portion of its structural height.

5. A bearing element according to claim 1, wherein the pressure gauge is completely or partially embedded in the bearing element.

6. A bearing element for lifting platforms, which is a displaceable part of a bearing arm of a load receiving element of a lifting platform, with a vehicle support element resting on that end of said bearing element that protrudes from a carrier, wherein at least one annular recess is arranged on the upper side of said bearing element, in which at least one vertically displaceable transfer element is disposed that seals a pressure chamber that is filled with hydraulic fluid and is disposed below said transfer element, with the transfer element generating in the pressure chamber a pressure that is characteristic of the weight force, wherein the transfer element is a hydraulic seal that is able to accept mechanical pressure forces on its side facing away from the hydraulic fluid, with the magnitude of said mechanical pressure forces corresponding to the weight force resting on it.

7. A bearing element according to claim 1, wherein the hydraulic fluid comprises at least one of water or an organic fluid.

8. A bearing element for lifting platforms, which is a displaceable part of a bearing arm of a load receiving element of a lifting platform, with a vehicle support element resting on that end of said bearing element that protrudes from a carrier, wherein at least one annular recess is arranged on the upper side of said bearing element, in which at least one vertically displaceable transfer element is disposed that seals a pressure chamber that is filled with hydraulic fluid and is disposed below said transfer element, with the transfer element generating in the pressure chamber a pressure that is characteristic of the weight force, wherein a round hole is located within the annular recess in the bearing element.

9. A bearing element according to claim 6, wherein the displaceable transfer element is annular and the pressure chamber is annular and is formed by said annular recess.

10. A bearing element according to claim 8, wherein the displaceable transfer element is annular and the pressure chamber is annular and is formed by said annular recess.

* * * * *